United States Patent
Zhao et al.

(10) Patent No.: US 12,259,797 B2
(45) Date of Patent: Mar. 25, 2025

(54) DATA SYNCHRONIZATION METHOD FOR HOST MACHINE AND BACKUP MACHINE OF STATION APPLICATION SERVER

(71) Applicant: CASCO SIGNAL CO., LTD., Shanghai (CN)

(72) Inventors: Yangjie Zhao, Shanghai (CN); Zhenjie Chen, Shanghai (CN); Yahui Cao, Shanghai (CN); Yingtao Lu, Shanghai (CN); Yafei Wang, Shanghai (CN)

(73) Assignee: CASCO SIGNAL CO., LTD., Shanghai (CN)

( * ) Notice: Subject to any disclaimer, the term of this patent is extended or adjusted under 35 U.S.C. 154(b) by 0 days.

(21) Appl. No.: 17/792,511

(22) PCT Filed: Sep. 24, 2021

(86) PCT No.: PCT/CN2021/120060
§ 371 (c)(1),
(2) Date: Jul. 13, 2022

(87) PCT Pub. No.: WO2022/241992
PCT Pub. Date: Nov. 24, 2022

(65) Prior Publication Data
US 2024/0184675 A1 Jun. 6, 2024

(30) Foreign Application Priority Data
May 21, 2021 (CN) .......................... 202110557449.8

(51) Int. Cl.
*G06F 11/16* (2006.01)
*G06F 11/14* (2006.01)

(52) U.S. Cl.
CPC ...... *G06F 11/1658* (2013.01); *G06F 11/1451* (2013.01); *G06F 11/1464* (2013.01)

(58) Field of Classification Search
CPC ............. G06F 11/1446; G06F 11/1448; G06F 11/1456; G06F 11/1458; G06F 11/1461; G06F 11/1464; G06F 11/1474
See application file for complete search history.

(56) References Cited

U.S. PATENT DOCUMENTS 6,108,300 A * 8/2000 Coile ...................... H04B 1/74
714/4.12
6,247,141 B1 * 6/2001 Holmberg ........... G06F 11/1451
707/999.001

(Continued)

FOREIGN PATENT DOCUMENTS

CN 103107904 A 5/2013
CN 108116456 A 6/2018

(Continued)

OTHER PUBLICATIONS

Soft Timers: Efficient Microsecond Software Timer Support for Network Processing by Aron and Druschel published Aug. 1, 2000; ACM Transactions on Computer Systems vol. 18 Issue 3 https://dl.acm.org/doi/pdf/10.1145/354871.354872 (Year: 2000).*

(Continued)

*Primary Examiner* — Joseph O Schell
(74) *Attorney, Agent, or Firm* — Amster, Rothstein & Ebenstein LLP

(57) ABSTRACT

A data synchronization method for a host machine and a backup machine of a station application server includes the following steps: receiving initial data sent by the host machine and storing the initial data in a backup machine local file by the backup machine to realize data synchronization between the host machine and the backup machine in an initial state after establishing a communication between the host machine and the backup machine; and receiving message data sent by a station terminal device in real time and storing the message data in a host machine local file, (Continued)

then sending the message data to the backup machine by way of polling, and receiving the message data and storing the message data in the backup machine local file by the backup machine to realize data synchronization between the host machine and the backup machine.

7 Claims, 1 Drawing Sheet

(56) References Cited

U.S. PATENT DOCUMENTS

| | | | | |
|---|---|---|---|---|
| 8,059,821 | B1* | 11/2011 | Begen | H04L 9/3242 714/4.11 |
| 8,792,374 | B1* | 7/2014 | Jain | H04L 45/42 370/252 |
| 2004/0153709 | A1 | 8/2004 | Burton-Krahn | |
| 2006/0069946 | A1* | 3/2006 | Krajewski, III | G06F 11/1658 714/4.1 |
| 2006/0253731 | A1* | 11/2006 | Petruzzo | G06F 11/1466 714/6.2 |
| 2018/0024893 | A1* | 1/2018 | Sella | G06F 11/1458 707/648 |
| 2020/0192773 | A1* | 6/2020 | Savino | G06F 11/1461 |
| 2021/0216411 | A1* | 7/2021 | Subramanian | G06F 11/1461 |

FOREIGN PATENT DOCUMENTS

| | | |
|---|---|---|
| CN | 109799797 A | 5/2019 |
| CN | 109871298 A | 6/2019 |
| CN | 110435722 A | 11/2019 |
| CN | 112416656 A | 2/2021 |
| CN | 113190385 A | 7/2021 |

OTHER PUBLICATIONS

China National Intellectual Property Administration, Search Report for China Patent Application No. 202110557449.8, Jun. 2, 2022, 2 pp., China.

International Search Report for PCT/CN2021/120060, Feb. 8, 2022, 4 pp., China.

Written Opinion for PCT/CN2021/120060, Feb. 8, 2022, 6 pp., China.

* cited by examiner

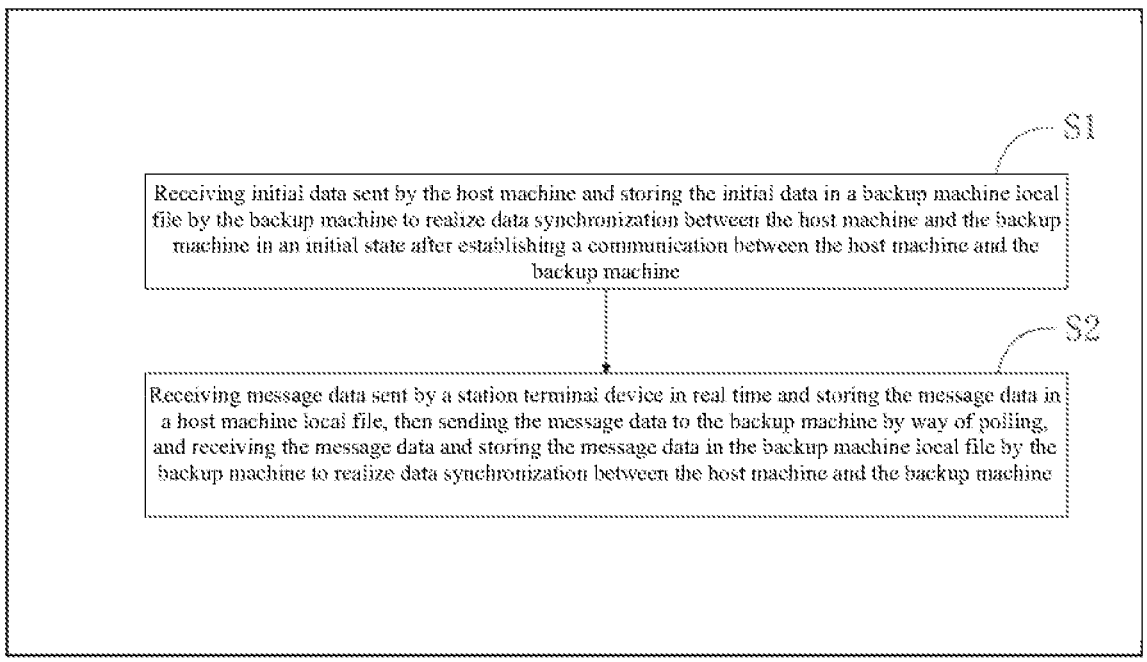

DATA SYNCHRONIZATION METHOD FOR HOST MACHINE AND BACKUP MACHINE OF STATION APPLICATION SERVER

CROSS-REFERENCE TO RELATED APPLICATIONS

This application is a U.S. national stage entry under 35 U.S.C. § 371 of PCT International Patent Application No. PCT/CN2021/120060, filed Sep. 24, 2021, which claims priority to Chinese Patent Application No. 202110557449.8, filed May 21, 2021, the contents of each of which are incorporated herein by reference in their entirety.

FIELD OF TECHNOLOGY

The present invention relates to a data synchronization method, in particular to a data synchronization method for a host machine and a backup machine of a station application server.

BACKGROUND

At present, the station application server often performs data interaction with a station terminal device by using a single-machine operation mode. The station application server using the single-machine operation mode is simple in device and low in maintenance cost but has great potential safety hazards. If the station application server fails and stops working, station terminal data cannot be sent to the center of a centralized traffic control system (CTC), resulting in communication and data transmission interruption.

SUMMARY

The present invention provides a data synchronization method for a host machine and a backup machine of a station application server. Two station application servers are arranged at the center of the CTC, where one of the station application servers serves as the host machine to perform data interaction with station terminal device while the other one of the station application servers serves as the backup machine for unexpected needs. The station application servers perform data synchronization in real time to guarantee that the station terminal device can be interacted with a new host machine timely in data when the host machine and the backup machine of the station application server are switched, thereby guaranteeing the real-time and the reliability of data interaction between the station terminal device and the application servers.

In order to achieve the above objective, the present invention provides a data synchronization method for a host machine and a backup machine of a station application server. The method specifically includes the following steps:
receiving initial data sent by the host machine and storing the initial data in a backup machine local file by the backup machine to realize data synchronization between the host machine and the backup machine in an initial state after establishing a communication between the host machine and the backup machine; and
receiving message data sent by a station terminal device in real time and storing the message data in a host machine local file, then sending the message data to the backup machine by way of polling, and receiving the message data and storing the message data in the backup machine local file by the backup machine to realize data synchronization between the host machine and the backup machine.

Further, it is necessary to differentiate the host machine from the backup machine in the two station application servers when a communication is established between the backup machine and the host machine; and a method for differentiating the host machine from the backup machine includes: taking the preferentially started station application server as the host machine.

Further, the host machine sends initial data to the backup machine after the communication is established between the backup machine and the host machine; if it is failed to send the initial data, a connection between the host machine and the backup machine is disconnected and the host machine is restored to a single-machine state; and if it is successful to send the initial data, a connecting state between the host machine and the backup machine is kept.

Further, the method of receiving the message data sent by the station terminal device and storing the message data in the host machine local file by the host machine includes the following steps:
analyzing the received message data and judging the type and the legality of the message data by the host machine; backing the received message data to a corresponding memory block of the host machine according to the type of the message data and storing the message data to the host machine local file by a corresponding file task if the message data is analyzed to be correct and legal; and otherwise, abandoning the message data.

Further, the method of receiving the initial data sent by the host machine and storing the initial data in the backup machine local file by the backup machine includes the following steps:
analyzing the received data and judging the type of the data by the backup machine, and storing the received data in a corresponding memory block of the backup machine according to the type of the data; and reading data in the corresponding memory blocks by different file tasks and then storing the data in the backup machine local file.

Further, in a data synchronization process of the host machine and the backup machine, the host machine and the backup machine send heartbeat data to one another in real time to verify the connecting state of the host machine and the backup machine so as to guarantee normal communication and data transmission between the host machine and the backup machine, the heartbeat data including identifiers of the host machine and the backup machine of the station application servers and the states of the station application servers.

Further, in a data synchronization process of the host machine and the backup machine, the host machine detects whether there are two host machines or not periodically to prevent data confusion as the two station application servers receive the message data of the station terminal device simultaneously; and if there are two host machines, the backup machine is connected to the host machines again after being rebooted for data synchronization between the host machines and the backup machine.

Further, the host machine and the backup machine communicate via TCP/IP.

Further, a format of the data stored by the backup machine is consistent with that of the data stored by the host machine.

Further, a way by which the backup machine is in data interaction with the station terminal device is consistent with a way by which the host machine is in data interaction with the station terminal device.

The present invention has the beneficial effects that in the present invention, the station application server as the host machine stores the message data sent by the station terminal device in the host machine local file and then sends the received message data to the station application server as the backup machine by way of polling, and stores the message data in the backup machine local file to realize data synchronization between the host machine and the backup machine, thereby guaranteeing that the station terminal device can be interacted with the station application servers in data quickly after the host machine and the backup machine are switched. In addition, the present invention can avoid two host machines effectively so as to prevent data confusion as the two station application servers receive the data of the station terminal device simultaneously. Meanwhile, both the host machine and the backup machine in the present invention store the data in the local files, so that the cost of a database is reduced.

BRIEF DESCRIPTION OF THE DRAWINGS

FIG. 1 is a flow diagram of a data synchronization method for a host machine and a backup machine.

DETAILED DESCRIPTION OF THE EMBODIMENTS

Further description of the present invention in detail will be made below in combination with drawings and specific embodiments. The advantages and features of the present invention are clearer according to description and claims below. It is to be noted that the drawings in a quite simplified form with an inaccurate ratio are merely used for describing objectives of the embodiments of the present invention in an assistant manner conveniently and clearly.

Two station application servers are arranged at the center of the CTC, where one of the station application servers serves as the host machine to perform data interaction with the station terminal device while the other one of the station application servers serves as the backup machine for switching to the backup machine to be in data interaction with the station terminal device when the host machine fails. The backup machine is communicated with the host machine in real time to backup data in the host machine. The backup machine is communicated with the host machine by adopting a TCP/IP communication mechanism, and furthermore, the host machine and the backup machine perform data interaction with the station terminal device in a same manner.

As shown in FIG. 1, the present invention provides a data synchronization method for a host machine and a backup machine of a station application server, including the following steps:

S1, the backup machine receives initial data sent by the host machine and stores the initial data in a backup machine local file to realize data synchronization between the host machine and the backup machine in an initial state after a communication between the backup machine and the host machine is established.

When the two station application servers are started to establish the communication, the preferentially started station application server is taken as the host machine and the later started station application server is taken as the backup machine. Specifically, the station application server is started to try to connect with the other station application server by means of the TCP/IP communication mechanism. If within a set time range, if the station application server is successfully connected with the other station application server, the self state of the station application server is set as the backup machine and the station application server starts to receive data sent by the host machine; and otherwise, the self state of the station application server is set as the host machine. In the embodiment, the set time range is 5 s.

After the communication is established between the backup machine and the host machine, the host machine reads the initial data therein and sends the data to the backup machine. The initial data includes data such as an underlying graph, a dispatching command, an expedited report, a storage yard train and a stage record. If it is failed to send the initial data, the connection between the host machine and the backup machine is disconnected, and the host machine is restored to the single-machine state. At the time, the center of CTC adopts the single-machine operation mode of the station application server. The station application server as the host machine stores the received message data of the station terminal device in the host machine local file. If the initial data is sent successfully, the connecting state between the host machine and the backup machine is kept.

The backup machine analyzes and judges the rationality and the data type of the initial data sent by the host machine after receiving the initial data sent by the host machine and then stores the initial data in the corresponding memory blocks according to the type of the initial data. The data type includes a dispatching command, an expedited report, a storage yard train and a running chart. Different file tasks read the initial data in the memory blocks in the backup machine and then store the initial data in the backup machine local file as a basis of data synchronization between the host machine and the backup machine.

S2, the host machine receives message data sent by the station terminal device in real time and stores the message data in the host machine local file, and then sends the message data to the backup machine by way of polling, and the backup machine receives the message data and stores the message data in the backup machine local file to realize data synchronization between the host machine and the backup machine.

The host machine receives the message data sent by the station terminal in real time and analyzes the received message data and judges the type and legality of the message data. The received message data is backed to the corresponding memory block of the host machine according to the type of the message data and the message data is stored to the host machine local file by a corresponding file task if the message data is analyzed to be correct and legal; and otherwise, the message data is abandoned. The file task can perform operation such as addition, deletion, modification and examination on the data when reading the data in the memory block of the host machine, and stores the operated data in the host machine local file. The type of the message data includes a dispatching command, an expedited report, a storage yard train and a running chart in the same way.

The host machine reads the message data in the memory block and sends the message data to the backup machine by way of polling. The message data is sent to the backup machine by way of polling, which can guarantee the real-time of the data.

The backup machine analyzes the message data and judges the rationality and the data type of the message data sent by the host machine, backs the message data to the corresponding memory block of the backup machine according to the type of the message data and then stores the message data to the backup machine local file by the corresponding file task to realize data synchronization between the host machine and the backup machine.

The format of the initial data stored by the backup machine to the backup machine local file in the step S1 and the format of the message data stored by the backup machine to the backup machine local file in the step S2 are consistent with that of the data stored by the host machine in the host machine local file. Furthermore, both the host machine and the backup machine store the data in the local files, so that the cost of a database is reduced.

In a data synchronization process of the host machine and the backup machine, the host machine and the backup machine send heartbeat data to one another in real time to verify the connecting state of the host machine and the backup machine so as to guarantee normal communication and data transmission between the host machine and the backup machine. The heartbeat data includes identifiers of the host machine and the backup machine of the station application servers and the states of the station application servers. If with the set time, the host machine or the backup machine does not receive the heartbeat data sent by one another, it is indicated that the connection between the host machine and the backup machine is disconnected, and the host machine returns to the single-machine state and is kept in operation in the single-machine state; and the backup machine is restarted to try to connect with the backup machine again.

In addition, in the data synchronization process of the host machine and the backup machine, the host machine detects whether there are two host machines or not periodically to prevent data confusion as the two station application servers receive the message data of the station terminal device simultaneously. Specifically, the host machine initiatively detects whether the connecting state of the backup machine is valid or not at every 30 s. If the connecting state of the backup machine is invalid, whether the station application server as the backup machine is logged in and registered as the host machine successfully or not is further detected. If the station application server as the backup machine is registered successfully, there are two host machines, and the backup machine logs out a starting program automatically and is then started timely by a watching program built in the backup machine to establish a communication relation with the host machine again, thereby a business is prevented from being affected after the backup machine logs out.

In the present invention, the station application server as the host machine stores the message data sent by the station terminal device in the host machine local file and then sends the received message data to the station application server as the backup machine by way of polling, and stores the message data in the backup machine local file to realize data synchronization between the host machine and the backup machine, thereby guaranteeing that the station terminal device can be in data interaction with the station application servers quickly after the host machine and the backup machine are switched. In addition, the present invention can avoid two host machines effectively so as to prevent data confusion as the two station application servers receive the data of the station terminal device simultaneously. Meanwhile, both the host machine and the backup machine in the present invention store the data in the local files, so that the cost of a database is reduced.

Although the content of the present invention has been described in details through the above preferred embodiments, it should be realized that the above description should not be considered as limit to the present invention. Many modifications and variations of the present invention will be apparent to those skilled in the art who have read the above content. Therefore, the scope of the present invention shall be defined by the appended claims.

The invention claimed is:

1. A data synchronization method for a host machine and a backup machine of a centralized traffic control system, the centralized traffic control system comprising a first station application server and a second station application server, wherein the data synchronization method comprises:
   the first station application server serves as the host machine while the second station application server serves as the backup machine when establishing a communication between the host machine and the backup machine;
   receiving, by the backup machine, initial data sent by the host machine;
   storing, by the backup machine, the initial data sent by the host machine in a local file of the backup machine to realize data synchronization between the host machine and the backup machine in an initial state after establishing a communication between the host machine and the backup machine;
   receiving, by the host machine, message data sent by a station terminal device in real time and storing the message data in a local file of the host machine, then sending the message data to the backup machine by way of polling;
   receiving, by the backup machine, the message data and storing the message data in the local file of the backup machine to realize data synchronization between the host machine and the backup machine;
   sending heartbeat data to each other in real time in a data synchronization process, by the host machine and the backup machine, to verify a connecting state of the host machine and the backup machine so as to guarantee normal communication and data transmission between the host machine and the backup machine, the heartbeat data comprising identifiers of the host machine and the backup machine of the station application servers and states of the station application servers;
   detecting, by the host machine, that two host machines are present in a data synchronization process of the host machine and the backup machine, when two host machines are present, connecting the backup machine to the host machines again after being rebooted for data synchronization between the host machines and the backup machine to prevent the first station application server and the second station application server receiving the message data of the station terminal device simultaneously.

2. The data synchronization method according to claim 1, wherein:
   the host machine sends initial data to the backup machine after the communication is established between the backup machine and the host machine;
   in a case where the host machine fails to send the initial data, a connection between the host machine and the backup machine is disconnected and the host machine is restored to a single-machine state; and in a case where the host machine succeeds in sending the initial data, a connecting state between the host machine and the backup machine is kept.

3. The data synchronization method according to claim 1, wherein the receiving the message data sent by the station terminal device and storing the message data in the local file of the host machine by the host machine comprises:

analyzing the received message data and judging a type and a legality of the message data by the host machine; and backing up the received message data to a corresponding memory block of the host machine according to the type of the message data and storing the message data to the host machine local file by a corresponding file task in a case where the message data is analyzed to be correct and legal; and otherwise, abandoning the message data.

4. The data synchronization method according to claim 1, wherein the method of receiving the initial data sent by the host machine and storing the initial data in the backup machine local file by the backup machine comprises:

analyzing the received data and judging a type of the received data by the backup machine, and storing the received data in a corresponding memory block of the backup machine according to the type of the data; and reading data in the corresponding memory blocks of the backup machine by different file tasks and then storing the data in the local file of the backup machine.

5. The data synchronization method according to claim 1, wherein the host machine and the backup machine communicate via TCP/IP.

6. The data synchronization method according to claim 1, wherein a format of data stored by the backup machine is consistent with that of data stored by the host machine.

7. The data synchronization method according to claim 1, wherein a way by which the backup machine is in data interaction with the station terminal device is consistent with a way by which the host machine is in data interaction with the station terminal device.

\* \* \* \* \*